Figure 1:
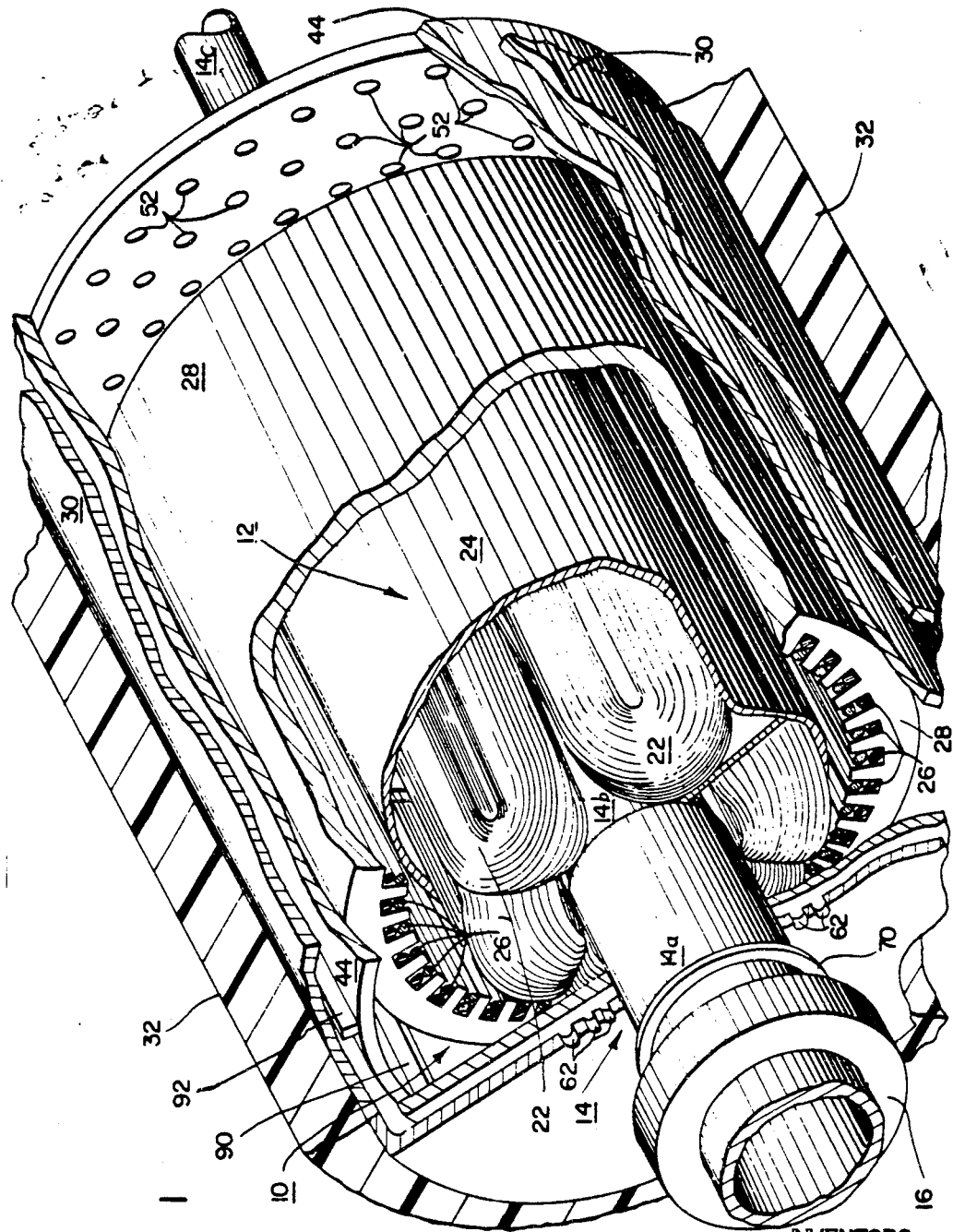

INVENTORS
RICHARD L. MELA
ALEXANDER KUSKO
EDGAR H. SIBLEY
BY Blair & Buckles
ATTORNEYS

INVENTORS
RICHARD L. MELA
ALEXANDER KUSKO
BY EDGAR H. SIBLEY

Blair & Buckles
ATTORNEYS

3,242,418
LOW TEMPERATURE ELECTROMECHANICAL TRANSDUCER

Richard L. Mela, Arlington, Alexander Kusko, Newton, and Edgar H. Sibley, West Acton, Mass., assignors to Dynatech Corporation, Cambridge, Mass.
Filed Aug. 31, 1962, Ser. No. 220,754
15 Claims. (Cl. 322—28)

This invention relates to the field of dynamo-electric machinery and, in particular, to a novel electric generator which operates at depressed temperatures. The generator, which has superconductive windings, is characterized by both small size and high efficiency.

The invention further concerns novel control mechanisms for the generator, and an improved configuration for the electrical conductors extending through the temperature transition region between the generator and its environment. It also relates to a novel method of containing stray magnetic fields in dynamo-electric equipment.

The construction of our generator is based on the fact that certain materials, when their temperatures are sufficiently lowered, undergo transitions to a state of zero or near-zero electrical resistivity, known as superconductivity. A number of elements, alloys and compounds in various forms have been found to exhibit this characteristic, generally at temperatures below 20° K. Each superconductive material presently known loses its superconductivity, i.e., becomes resistive in the presence of a magnetic field exceeding a critical level whose value depends on temperature, the electric current density in the material and the frequency of the current. The critical field level also varies widely according to the material.

Among suggested applications for superconductivity are components in the electric power field. For example, the efficiency of electric motors and generators might be substantially increased by using superconductive windings which, because of their virtual lack of resistivity, exhibit little or no $I^2R$ loss.

A principal object of our invention is to provide an improved dynamo-electric machine incorporating superconductive windings and having efficiency, size and weight which compare favorably with machines using resistive windings.

Another object of the invention is to provide a dynamo-electric machine of the above type characterized by a substantially smaller size and weight than other machines of similar capacity.

A further object of the invention is to provide a dynamo-electric machine of the above type characterized by a minimum of internal heat generation.

A still further object is to provide a dynamo-electric machine of the above type characterized by a low level of heat leakage from its environment.

A more specific object of the invention is to provide a generator having the above characteristics.

Yet another object is to provide a superconductive apparatus electrically connected to components in a relatively high temperature environment and characterized by reduced heat leakage from the environment.

Another object is to provide a system including a machine of the above type and having relatively small size and weight and high efficiency even when taking into consideration the required refrigeration apparatus.

Other objects of the invention will in part be obvious and will in part appear hereinafter.

Figure 2:
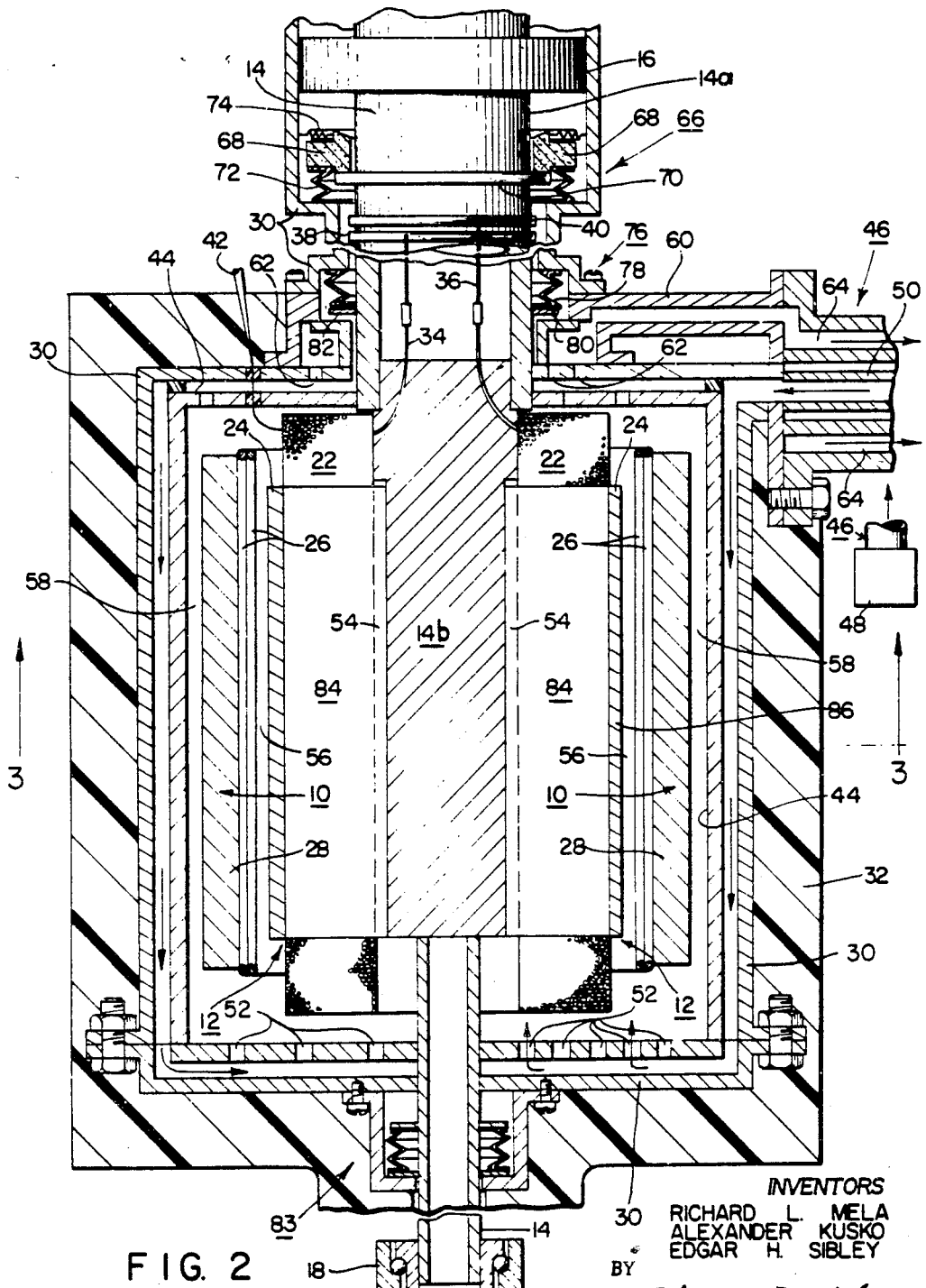
Figure 3:
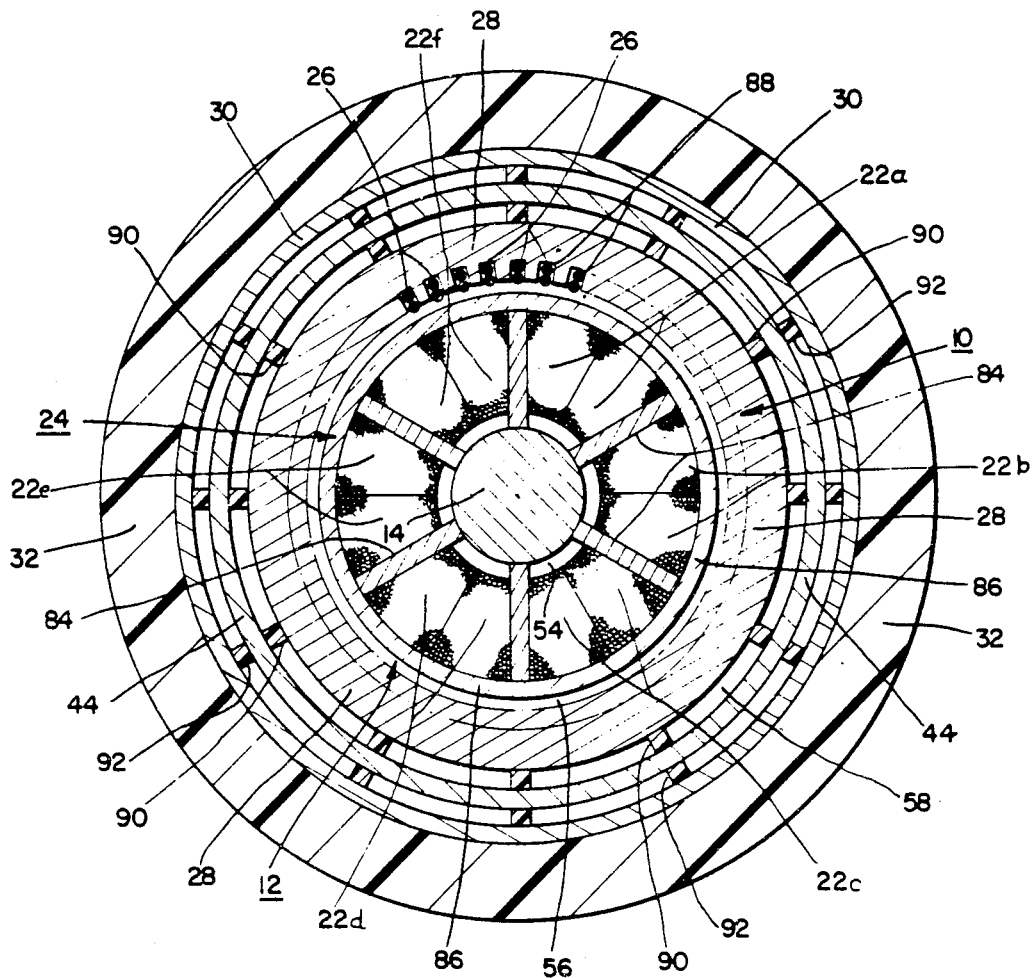
Figure 4:
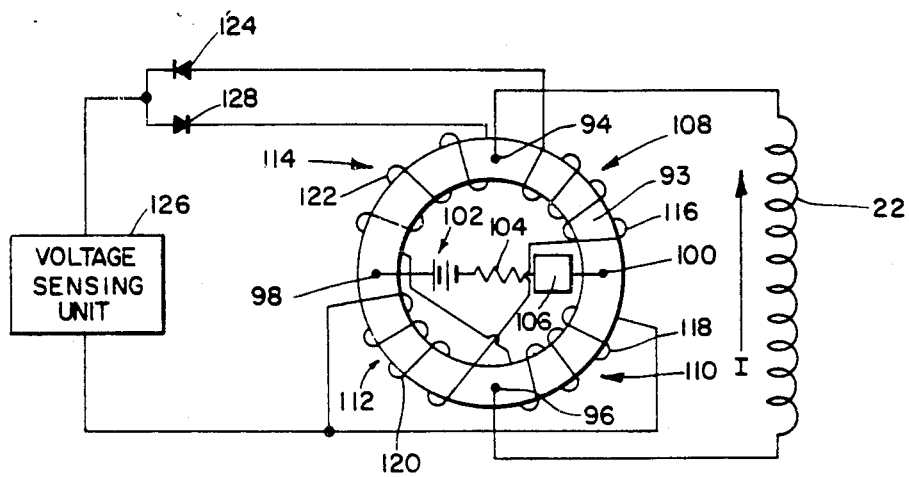
Figure 5:
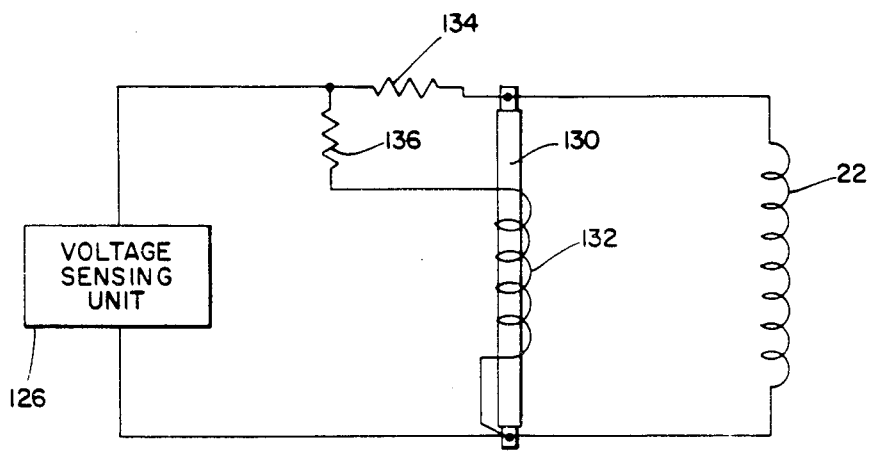

For a fuller understanding of the nature and objects of the invention, reference should be had to the following detailed description taken in connection with the accompanying drawings in which:

FIG. 1 is a perspective view, partly broken away, of a generator embodying our invention, FIG. 2 is an axial section of the generator of FIG. 1; this figure also schematically depicts the refrigerating apparatus used in the generating system, FIG. 3 is a radial section taken along line 3—3 of FIG. 2, FIG. 4 is a schematic diagram of a field current regulator which may be used in our generators, and FIG. 5 is a schematic diagram of another field current regulator.

In general, a motor or generator embodying our invention includes superconductive armature and field windings. Since the current passing between the armature winding and other devices is materially greater than the current supplied to the field winding, the armature winding is preferably mounted on the stator, with the field winding on the rotor.

Unlike prior materials, superconductive materials presently available are capable of retaining superconductivity in the presence of strong magnetic fields. At the same time, because there is little or no $I^2R$ heat generation, they can operate with current densities much greater than the capabilities of ordinary, non-superconductive wires. For example, a niobium-tin ($Nb_3Sn$) wire, when properly fabricated, retains superconductivity in a magnetic field of 50,000 gauss at a temperature of 12° K., while carrying a current density in excess of 30,000 amp./cm.$^2$ at power frequencies.

In a generator, a flux density of this magnitude is desirable, since it permits the use of a relatively short conductor length, i.e., a small number of turns, in the armature winding for a reasonably high output voltage. In fact, the conductor length for a given output voltage is substantially less than in prior generators, and this, coupled with the smaller conductor cross section necessary for a large output current, results in a considerable decrease in size and weight.

It should also be borne in mind that, with fewer turns in the armature winding, the inductance of the winding and the armature reaction are both reduced, thereby improving the regulation of the generator.

A corollary reason for the high flux density is that it is well beyond the saturation point of iron, and therefore iron can be partially or fully eliminated with a proportionate increase in the required ampere turns, which is substantially less than the ratio of the reluctance of unsaturated iron to that of a gas. This can result in an even greater size and weight reduction than that provided by the decrease in the volume of the armature winding.

The field in a generator operating with the above flux density is readily produced by means of a superconductive field winding. In fact, as described below, a current started in the field winding can be made to persist indefinitely therein without any connection to an external power source. In practice, a connection may be made for the purpose of establishing or adjusting field current to control the output voltage (in a generator), a novel regulator circuit being used for this purpose.

Some idea of the reduction in size provided by the present invention may be gained from the fact that a 1000 kilowatt generator constructed in accordance with the invention occupies less than one cubic foot. There is a corresponding saving in weight. Even taking into consideration the size and weight of the refrigeration apparatus needed to maintain the required low temperature environment, the size and weight are well below the values for comparable conventional units.

Moreover, with the copper and iron loss essentially eliminated, the over-all efficiency of a generator, including the power expended in refrigeration, is well below that of prior systems. In fact the efficiency of a 1000 kilowatt generating system embodying our invention is comparable to that of the largest conventional generators.

Another important feature of our construction involves the electrical conductors extending between the low tempertaure interior of the machine and the higher temperature environment. These conductors will be efficient conductors of heat into the interior of the machine; in fact, they are ordinarily the largest source of heat flow into the machine. Therefore, in the past, considerable work has been directed to conductor designs minimizing the in-flow of heat.

In our construction, each conductor is tapered from a very small diameter in the low temperature region to a relatively large diameter in the environment. Assuming the use of copper conductors, for example, the electrical resistivity at 20° K. is less than 1 percent of the value at 273° K. (0° C.). Accordingly, even at the reduced end of each conductor, there is little heat generation, since this portion is well within the low temperature region. The thermal resistivity also decreases as the temperature drops, and therefore has a low value at the extreme low temperature end of the tapered lead. However, this is offset at least in part by the small diameter at this end. Moreover, as the temperature increases above the extremely low values (e.g., 25° K.), the thermal resistivity rises at a much more rapid rate than the electrical resistivity and reaches substantially its 0° C. value at a temperature of 125° K. Thus, the intermediate portions of the tapered lead have relatively high thermal resistivity and relatively low electrical resistivity. When combined with the gradual increase in diameter, these characteristics result in a minimum in-flow of heat to the interior of the machine.

We have also devised novel field current control arrangements, as well as a superconductive flux shielding and guiding arrangement, both of which are described in detail below.

As shown in FIGS. 1, 2 and 3, a generator embodying our invention includes a stator generally indicated at 10 and a rotor indicated at 12 mounted for rotation on a shaft 14. The shaft 14 is journalled in bearings 16 and 18. The rotor 12 includes a field winding 22 embedded in a generally cylindrical frame 24, and the stator 12 includes an armature winding 26 mounted in a cylindrical frame 28 surrounding and closely spaced from the rotor frame. The unit is enclosed by a housing 30 around which a thermal insulator 32 is disposed. The insulator 32 may be of any conventional cryogenic type. For example, it may be an evacuated cryogenic insulator or it may be a double-Dewar arrangement with a cryogenic fluid such as liquid nitrogen serving as an outer thermal barrier.

Connections to the field winding 22 may be made by way of leads 34 and 36 terminating in slip rings 38 and 40 affixed to the shaft 14. The leads 34 and 36, which extend through the shaft, are electrically and thermally insulated therefrom by suitable means not shown in the drawings. The ends of the armature winding 26 are brought out to tapered leads 42, which undergo a reduction in diameter from the point where they enter the insulator 32 to their termini adjacent to a stray flux shield 44 disposed within the housing 30. The leads 42 are suitably insulated from the flux shield and any other metallic parts through which they may pass. A conduit generally indicated at 46 extends through the insulator 32 and into the housing 30 for the purpose of conducting a low temperature coolant into the cavity to maintain the windings 22 and 26 below their critical temperature.

More specifically, the conduit 46 is used to convey liquid helium, or preferably, gaseous helium from a helium refrigerator 48 to the interior of the generator. The windings 22 and 26 are of materials, such as described above, capable of superconductivity at low temperatures, and the presence of the coolant within the generator is sufficient to maintain the windings below the temperature at which they become superconductive. The flow of coolant from the refrigerator 48 is through an inner pipe 50 in the conduit 46 and thence into the space between the housing 30 and flux shield 44. The fluid flows to the left (FIG. 2) through this space and then reverses its direction, passing to the right through perforations 52 in the flux shield. In the illustrated embodiment, the flow then divides into three generally concentric paths, viz., passages 54 within the rotor 12, the gap 56 between the rotor and stator and outer passages 58 disposed around the stator. Finally, the coolant enters a pipe 60 by way of holes 62 in the flux shield 44 and returns to the refrigerator 48 by way of an outer pipe 64 in the conduit 46 concentric with the inner pipe 50. The flow through the pipe 64 provides a thermal barrier to the flow of heat into the inner pipe.

As shown in FIG. 2, we have provided a seal, generally indicated at 66, to prevent leakage of the coolant from the generator into the bearing 16. The seal 66 also prevents the flow of the bearing lubricant into the cold regions of the generator, where it might deleteriously affect operation of the system. It includes an impregnated graphite ring 68, urged axially against a collar 70 integral with the shaft 14 by a spring bellows 72. The bellows 72, which is secured to the housing 30, also secures the ring 68 against rotation with the shaft 14. A corrugated annular diaphragm 74, extending radially between the ring 68 and housing 30, provides an additional measure of isolation within the seal 66.

Since the seal 66 may be located at some distance from the generator, it is possible that the coolant might circulate, for example by means of convection, between the interior of the generator and the relatively warm region along the shaft 14. The resulting heating of the coolant would increase the load on the refrigerator 48, thereby decreasing the over-all efficiency of the system, as well as increasing the size and weight of the refrigeration apparatus. To prevent such circulation of the coolant, we have provided a second seal, generally indicated at 76, immediately adjacent to the generator. This seal, which need not be completely impervious to flow of the coolant, may consist simply of a spring bellows 78 secured to the housing 30 and carrying a small graphite ring 80, which it urges axially against a collar 82 rotating with the shaft 14.

In the unit specifically described herein, the bearing 16 takes a far greater proportion of the load than the bearing 18, and, accordingly, the latter may be a conventional sealed or packed bearing. There is therefore no problem of leakage from the bearing 18 into the generator, or vice versa, and a seal 83, similar to the seal 76, is therefore provided at this end of the shaft 14.

In this connection, it is noted that the shaft 14 is preferably constructed in three sections, viz., 14a at the right (FIG. 2), 14b within the rotor 12 and 14c at the left. The rotor is driven from the section 14a, and therefore this section has a considerably greater diameter than the section 14c in order to accommodate the torque transmitted by it.

The structure of the rotor 12 is illustrated in detail in FIGS. 1 and 3. As shown therein, a plurality of fin-like spokes 84 extend from the shaft section 14b. The field winding takes the form of closely packed coils 22a–22f wound around the spokes 84 and contained within the rotor structure by a circumferential band 86 suitably secured to the spokes 84, e.g., by welding or other means of assembly.

At the high speed contemplated for operation of the generator, the centrifugal forces exerted by the field windings are well beyond the structural capabilities of many materials, especially when the effects of the extremely low operating temperature are taken into consideration. Some materials, however, have very high strengths and adequate ductility at low temperatures, an example being the alloy Ti-4Al-3Mo-IV when suitably treated, and such materials are preferably used in constructing the rotor 12 and shaft 14. The tight packing of the winding 22 minimizes flexure as the forces exerted on the coils 22a–22f vary during rotation of the rotor 12. The flexure generates heat within the field winding and thus increases the problem of cooling it. If desired, a suitable potting material may be used to insure rigidity of the winding 22.

The stator frame 28 is provided with a series of internal, longitudinal extending slots 88, which accommodate the armature winding 26. The frame 28 is supported from the flux shield (or outer structure) 44 by means of ribs 90 (FIG. 3), and the flux shield, in turn, is supported from the housing 30 by ribs 92.

With further reference to FIG. 3, the flux shield 44 provides one of the functions of the iron used in conventional motors and generators. More specifically, the iron provides a relatively low reluctance path which guides the magnetic flux along the desired magnetic circuits within the machine. Since the reluctance of air is substantially greater than that of iron, the flux does not stray outwardly in any appreciable amount from the iron used in the stator structure.

In the generator described herein, the flux shield 44 is formed from a sheet of superconductive material, for example, niobium-tin. As is well known, a superconductive object is impervious to magnetic flux up to the quenching value, and therefore, the shield 44 prevents the flux from straying from the generator.

A somewhat similar function is served by magnetic shields 94, which take the form of thin sheets of superconductive material disposed between the respective field coils 22a–22f. The magnetic impermeability of these shields largely prevents the leakage of the flux developed by each coil through the coils adjacent thereto. It will be noted that the superconductive shields are more effective than iron as flux guiding members, inasmuch as there is an infinite ratio between their reluctance and that of the regions into which they force the magnetic flux to pass.

The leads 42 are preferably of a material in which the product of thermal conductivity and electric resistivity has a low value over the temperatures encountered. Copper is an example of a material meeting this criterion to a reasonable degree. Although it is a good heat conductor, with the attendant problem of conduction of heat into the low temperature region from the exterior of the generator, its low electrical resistivity more than makes up for this by minimizing the generation of heat due to the electric current in the leads. The copper leads are brought into the generator only far enough to reach a temperature sufficiently low for superconductivity of the materials of which the windings are fabricated. Thus, the low loss superconductivity of the windings is carried outwardly as far as possible in order to maintain internal heat generation at the lowest possible level.

Depending on the material used for the wire and other factors, it may be preferable that the windings be series wound rather than connected in a parallel arrangement. Thus, each winding may be made from a single wire whose only connections are to the generator leads. The reason for this is that the high quenching field of certain conductors is due at least in part to their internal crystalline structure. A secure connection between two such wires may, in some cases, disturb this structure to such an extent that the quenching field will be greatly decreased at the connection. Thus, self quenching at the connection might take place with a current far below the level desired from the generator. This is not a problem where the connections are made to the generator leads, since superconductivity is not required at these points. In cases where connections between superconductors are required, it will generally be desirable to locate them in regions where the magnetic field is relatively weak, so as to minimize the quenching problem.

Illustratively, a generator of the above construction and designed for an output power of approximately 1000 kilowatts may be a three phase, six pole unit providing 480 volts R.M.S. line-to-line, with a speed of 12,000 r.p.m. and a frequency of 600 c.p.s. Assuming a peak magnetic flux density of 50,000 gauss, the length of the stator will be on the order of 5 inches, and the outer diameter of the rotor will be about 3 inches. The armature winding 26 is preferably a single path, delta wound winding, and the armature frame 28 has 48 slots with two conductors per slot as shown. Assuming a current density in the armature wire of 30,000 amperes per cm.$^2$ at an operating temperature of 12° K., the diameter of the wire is approximately 0.1 inch.

In order to minimize eddy current losses in the rotor frame 24, it may be desirable to use a laminated structure for the spokes 84 and band 86. The laminations take the form of radial sections with respect to the axis of rotation, i.e., they are separated in the longitudinal direction of the shaft 14. The individual laminations are separated by high resistivity or non-conducting material.

In FIG. 4 we have illustrated a field current regulator which operates to maintain the output voltage of the generator at a desired level. Assume, for example, that the field winding is the rotor winding 22 of FIG. 1. The winding is connected to diametrically opposite points of a superconducting ring 93 by means of connections 94 and 96. Connected between another pair of diametrically opposed connections 98 and 100 is a voltage source represented by a battery 102 in series with a resistor 104 and a gate 106. The connections 94–100 divide the ring 93 into segments 108, 110, 112 and 114 around which are wound coils 116, 118, 120 and 122. The windings 116 and 120 are in series with each other and a diode 124 across the output of a voltage sensing unit 126, and the coils 118 and 122 are in series with a diode 128 across the output of the sensor. The diodes 124 and 128 are connected to conduct in opposite directions.

The voltage sensing unit 126 is a device which has an output or error voltage whose polarity depends on whether the generator output voltage is above or below the desired level and whose magnitude is a function of the difference between the actual and desired voltages. Devices of this type are well known in the art. In any case, in its most elementary form, the sensor may comprise a circuit which algebraically subtracts the generator output voltage from the voltage of a battery or similar device whose voltage is at the desired level.

In considering operation of the voltage regulator, assume first of all that the generator output voltage is at the desired level. The output voltage of the sensing unit 126 is therefore zero, and the entire ring 93 is superconductive. Accordingly, the current I in the field winding 22 circulates without dissipation in the superconductive loop comprising the field winding and the ring 93. This current will circulate indefinitely as long as there is no dissipation in the loop and also no induction of a current-changing potential therein.

Should the output voltage of the generator decrease below the desired value, the sensing unit 126 will develop an error voltage whose polarity is such as to be passed by the diode 128 and blocked by the diode 124. Accordingly, a current passes through the coils 118 and 122 and if the error is large enough, the current will be of sufficient magnitude to quench the ring segments 110 and 114, i.e., render them resistive. Thus, there is no longer a superconductive path through the ring 93 between the field winding connections 94 and 96. At the same time, the sensing unit 126 energizes the gate 106 to connect the battery 102 between the terminals 98 and 100.

Since the ring segments 108 and 112 are still superconductive, the connections 98 and 100 are effectively "short circuited" to the connections 94 and 96, respectively. Thus, the battery 102 is in series with the winding 22, and the polarity of the battery is such as to increase the current in the winding. In this connection, it should be noted that the voltage of the battery 102 and resistance of the resistor 104 should be so proportioned that the battery can support a current in the winding 22 of at least the maximum value which will be required under operating conditions.

As the current in the winding 22 increases, the output voltage of the unit 126 decreases until it reaches a point, close to zero, at which the current in the windings 118 and 122 is insufficient to maintain the segments 110 and 114 in the resistive condition. These segments therefore become superconductive, and the field winding current circulates in the superconductive loop at its new level. The decrease in the output voltage of the sensing unit also de-energizes the gate 106 to disconnect the battery 102.

Should the generator output voltage increase above the desired value, a similar sequence of operation will take place, with current passing through the diode 124 and quenching the ring segments 108 and 112. Thus, the battery 102 will be connected across the winding 22 with the opposite polarity to that of the low voltage case, and its potential will cause a decrease in current field winding 22.

The operation of the regulator requires that the ring 93 be in a low temperature region in order to provide superconductivity. Furthermore, in order to insure superconductivity in the connections 94 and 96, it is preferable that they be permanent connections rather than sliding contacts. Thus, the ring 93 should be mounted on the rotor if the field winding rotates. On the other hand, the battery 102, resistor 104 and gate 106 may be located outside the generator together with the diodes 124 and 128 and voltage sensing unit 126.

The windings 116-122 should be superconductive in order to minimize heat dissipation within the low temperature region. If they are mounted within the shaft section 14a (FIG. 2) so as to rotate therewith, then the two slip rings 38 will suffice. If they are stationary, additional slip rings (not shown) are provided to connect them to the rotating parts.

In this connection, it is noted that the field winding 22 preferably has a large number of turns, so that a relatively small current, e.g., 20 amperes, will provide the desired field. This increases the reliability of the slip rings and the brushes associated therewith, and also it minimizes the demands on the battery 102.

In FIG. 5 we have illustrated another embodiment of the voltage regulator. The persistent current loop of the field winding 22 includes the gate conductor 130 of a cryotron whose control conductor is indicated at 132. The voltage sensing unit, which in this case has sufficient gain to supply the field current, is connected in series with the winding 22 by way of a resistor. It is connected to the conductor 132 by way of a resistor 136.

When the error voltage from the sensing unit 126 increases above a predetermined level, the current through the conductor 132 causes quenching of the gate conductor 130. The current through the winding 22 is then highly dependent on the current from the sensing unit 126 passing through the resistor 134. The winding current therefore changes until the error voltage drops below the quenching level of the gate conductor 130. When the conductor 130 is superconductive, the current in the field winding is only slightly dependent on the current through the resistor 134, since the inductance of the winding is much less than that of the conductor 130.

It will be noted that the voltage regulators of FIGS. 4 and 5 may be used to develop the initial current in the field winding when the generator is started up.

Alternatively, the armature winding may be pulsed with a large current, which quenches the field winding. When the current diminishes and the field associated therewith decreases below the quenching level of the field winding, a persistent current will be induced in the closed superconductive loop of which the winding is a part. The persistent current then maintains a field just below the quenching level of the field winding. This method is particularly suitable where a voltage regulator is not needed, since it eliminates the need for external connections to the rotating field winding.

While the above description has been directed specifically to generators, its application to motors and other rotative electrical devices will be apparent to those skilled in the art.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

We claim:

1. A dynamo-electric machine comprising
   (a) a stator structure supporting a stator winding,
   (b) a rotor supporting a rotor winding for magnetic coupling between said rotor and stator windings,
   (c) said windings being of superconductive material,
   (d) flux guiding means comprising objects of superconducting material disposed to force substantially all flux developed by current in one of said windings to link the other of said windings,
   (e) a superconductive shield around said windings,
   (f) lead-in conductors electrically connecting at least a first one of said windings to a point having a temperature substantially higher than the temperature of said first winding,
       (1) said lead-in conductors having a relatively large diameter at said high temperature point and a substantially reduced diameter at the region where the temperature is substantially that of said first winding,
       (2) the diameter of said conductors tapering between said point and said region,
   (g) and means for regulating the current in one of said windings, said current regulating means including
       (1) a superconductive gate conductor in series with the current-regulated winding,
       (2) a control conductor disposed to render said gate conductor resistive, and
       (3) means for energizing said control conductor and applying across it a voltage of the proper polarity to change the current in said regulated winding in such amount as to decrease the difference between the actual and desired values thereof.

2. A dynamo-electric machine comprising
   (a) a stator supporting a stator winding,
   (b) a rotor supporting a rotor winding for magnetic coupling between said rotor and stator windings,
   (c) said windings being of superconductive material,
   (d) flux guiding means comprising objects of superconducting material disposed to force substantially all flux developed by current in one of said windings to link the other of said windings.

3. A dynamo-electric machine comprising
   (a) a rotor including a generally cylindrical rotor frame mounted on a shaft for rotation therewith,
   (b) a stator including a stator frame radially spaced from and coaxial with said rotor frame,
   (c) said rotor frame including a plurality of sheet-like spokes extending radially from and longitudinally along said rotor, (d) said rotor including a rotor winding comprising a plurality of coils wound longitudinally around the respective spokes,
(e) said stator frame having a plurality of longitudinally extending slots,
(f) said stator including a stator winding extending through said slots along said stator frame,
(g) said windings being superconductive at the temperature of operation of said machine.

4. The combination defined in claim 3 including a superconductive shield enclosing said windings.

5. The combination defined in claim 4 including a band circumferentially around said spokes and retaining said rotor coils in place against the centrifugal forces resulting from rotation of said rotor.

6. The combination defined in claim 3 including sheets of superconductive material extending radially with respect to said shaft and disposed between said rotor windings.

7. A generator comprising
(a) a rotor including a generally cylindrical rotor frame mounted on a shaft for rotation therewith,
(b) a stator including a stator frame radially spaced from and coaxial with said rotor frame,
(c) said rotor frame including a plurality of sheet-like spokes extending radially from and longitudinally along said rotor,
(d) said rotor including a field winding comprising a plurality of coils wound longitudinally around the respective spokes,
(e) said stator frame having a plurality of longitudinally extending slots,
(f) said stator including an armature winding extending through said slots along said stator frame,
(g) said field winding being superconductive,
(h) a closed superconductive path including said field winding, whereby a persistent current may be induced in said field winding to provide the magnetic field for said generator.

8. The generator defined in claim 7 in which said armature winding is superconductive.

9. The generator defined in claim 7 including a superconductive magnetic shield around said winding.

10. The generator defined in claim 7 including sheets of superconductive material disposed between said field coils and thereby minimizing leakage of magnetic flux between adjacent field coils.

11. In a dynamo-electric machine having a superconductive winding enclosed in a low temperature region thermally insulated from a high temperature region and having leads connected to said winding and extending from said low temperature region to said high temperature region, the combination in which
(a) each of said leads has a relatively large cross sectional area in said high temperature region and a relatively low cross sectional area substantially less than said high cross sectional area in said low temperature region, and
(b) the cross sectional area of each of said leads tapers between said large and low areas in the intermediate temperature region between said high temperature and said low temperature regions.

12. In electrical apparatus having superconductive conductors enclosed in a low temperature region thermally insulated from a high temperature region by an insulating medium, the combination with said conductor of an electrical lead connected to said conductor and extending to said high temperature region, said lead having a cross sectional area of a relatively large value in said high temperature region and relatively low value in said low temperature region and tapering between said high and low values in said insulating medium.

13. A generator comprising
(a) a superconductive field winding having first and second ends,
(b) an armature winding magnetically coupled to said field winding and mounted for relative rotation of said windings, whereby such rotation develops an output voltage in said armature winding,
(c) means for controlling the current in said field winding comprising
(1) a superconductive gate conductor connected between said ends of said field winding,
(2) means responsive to the output voltage of said generator,
(3) means connecting said voltage responsive means across said gate conductor,
(4) a quenching conductor energized by said voltage responsive means and arranged thereby to quench said gate conductor upon the occurrence of a predetermined error in said output voltage,
(5) said voltage responsive means developing across said gate conductor current of sufficient magnitude and the proper polarity to provide the current in said field winding corresponding to the desired output voltage of said generator.

14. A generator comprising
(a) a superconductive field winding having first and second ends,
(b) an armature winding magnetically coupled to said field winding and mounted for relative rotation of said windings, whereby such rotation develops an output voltage in said armature winding,
(c) means for controlling the current in said field winding comprising
(1) means forming a superconductive ring,
(2) means superconductively connecting the ends of said field winding to spaced-apart points on said ring dividing said ring into first and second portions,
(3) a voltage source connected between third and fourth points in said first and second portions respectively, and
(4) means responsive to said output voltage for quenching parts of said first and second portions to connect said voltage source in series with said field winding.

15. The combination defined in claim 14 in which
(a) said third point divides said first portion into first and second sub-portions,
(b) said fourth point divides said second portion into third and fourth sub-portions,
(c) said third sub-portion being adjacent to said first sub-portion,
(d) voltage-sensing means developing an error voltage indicative of the difference between said output voltage and the desired output voltage of said generator,
(e) first and second control conductors in close proximity to said first and fourth sub-portions,
(f) third and fourth control conductors in close proximity to said second and third sub-portions,
(g) whereby currents through said control conductors quench the sub-portions in close proximity thereto,
(h) means for passing a current through said first and second control conductors when said error voltage has a first polarity, and
(i) means for passing current through said third and fourth control conductors when said error voltage has the polarity opposite to said first polarity.

References Cited by the Examiner
UNITED STATES PATENTS

| | | | |
|---|---|---|---|
| 2,364,000 | 11/1944 | Sawyer | 310—52 |
| 2,886,765 | 5/1959 | Hetzler | 322—28 |
| 3,005,117 | 10/1961 | Buchhold | 310—40 |
| 3,048,768 | 8/1962 | Conger | 322—28 |

ORIS L. RADER, *Primary Examiner.*

DAVID X. SLINEY, *Examiner.*